United States Patent [19]

Aehnelt et al.

[11] Patent Number: 5,018,278
[45] Date of Patent: May 28, 1991

[54] PROBE HEAD OF THE SWITCHING TYPE

[75] Inventors: Hans-Peter Aehnelt, Oberkochen; Eckhard Enderle, Aalen/Dewangen; Michael Wirth, Aalen, all of Fed. Rep. of Germany

[73] Assignee: Carl-Zeiss-Stiftung, Heidenheim/Brenz, Oberkochen, Fed. Rep. of Germany

[21] Appl. No.: 442,605

[22] Filed: Nov. 29, 1989

[30] Foreign Application Priority Data

Dec. 15, 1988 [DE] Fed. Rep. of Germany ....... 3842151

[51] Int. Cl.$^5$ .............................................. G01B 5/03
[52] U.S. Cl. ...................................... 33/559; 33/556; 33/503
[58] Field of Search ................. 33/556, 558, 559, 561, 33/503, 504, 832

[56] References Cited

U.S. PATENT DOCUMENTS

| | | | |
|---|---|---|---|
| 3,798,779 | 3/1974 | Gluck | 33/558 |
| 3,855,708 | 12/1974 | Tann et al. | 33/558 |
| 4,153,998 | 5/1979 | McMurtry . | |
| 4,158,919 | 6/1979 | McMurtry | 33/556 |
| 4,389,781 | 6/1983 | Donaldson | 33/503 |
| 4,507,868 | 4/1985 | Tuss | 33/503 |
| 4,516,327 | 5/1985 | Kanda et al. | 33/556 |
| 4,611,403 | 9/1986 | Morita et al. | 33/561 |
| 4,625,417 | 12/1986 | Cusack | 33/642 |
| 4,637,119 | 1/1987 | Schneider et al. | 29/568 |
| 4,782,545 | 11/1988 | Aubele | 33/557 |
| 4,835,871 | 6/1989 | Pesikov | 33/503 |
| 4,854,050 | 8/1989 | McMartry | 33/558 |
| 4,882,848 | 11/1989 | Breyer et al. | 33/559 |

FOREIGN PATENT DOCUMENTS

| | | |
|---|---|---|
| A13420139 | 6/1985 | Fed. Rep. of Germany . |
| A1249573 | 5/1986 | German Democratic Rep. . |
| 60-49204 | 3/1985 | Japan ........... 33/561 |
| 1441157 | 11/1988 | U.S.S.R. ........... 33/503 |

Primary Examiner—William A. Cuchlinski, Jr.
Assistant Examiner—C. W. Fulton
Attorney, Agent, or Firm—Hopgood, Calimafde, Kalil, Blaustein & Judlowe

[57] ABSTRACT

The invention contemplates a pneumatically driven piston as a preloading device, continuously urging the movable part (11) of a probe head into precise seating engagement with its fixed bearing (10), (12) in the housing of the probe head. The piston is movable in a cylinder (4) that is supplied with variable regulated pressure determined by a controlled regulating valve (16). Different contacting forces can be automatically and rapidly adjusted by the control system (18) of a coordinate-measuring machine to which the probe head is mounted, and the probe head can be tared to compensate for the different individual weights of successively different probe pins that are used in a given program of multiple-point coordinate measurements on a workpiece.

9 Claims, 2 Drawing Sheets

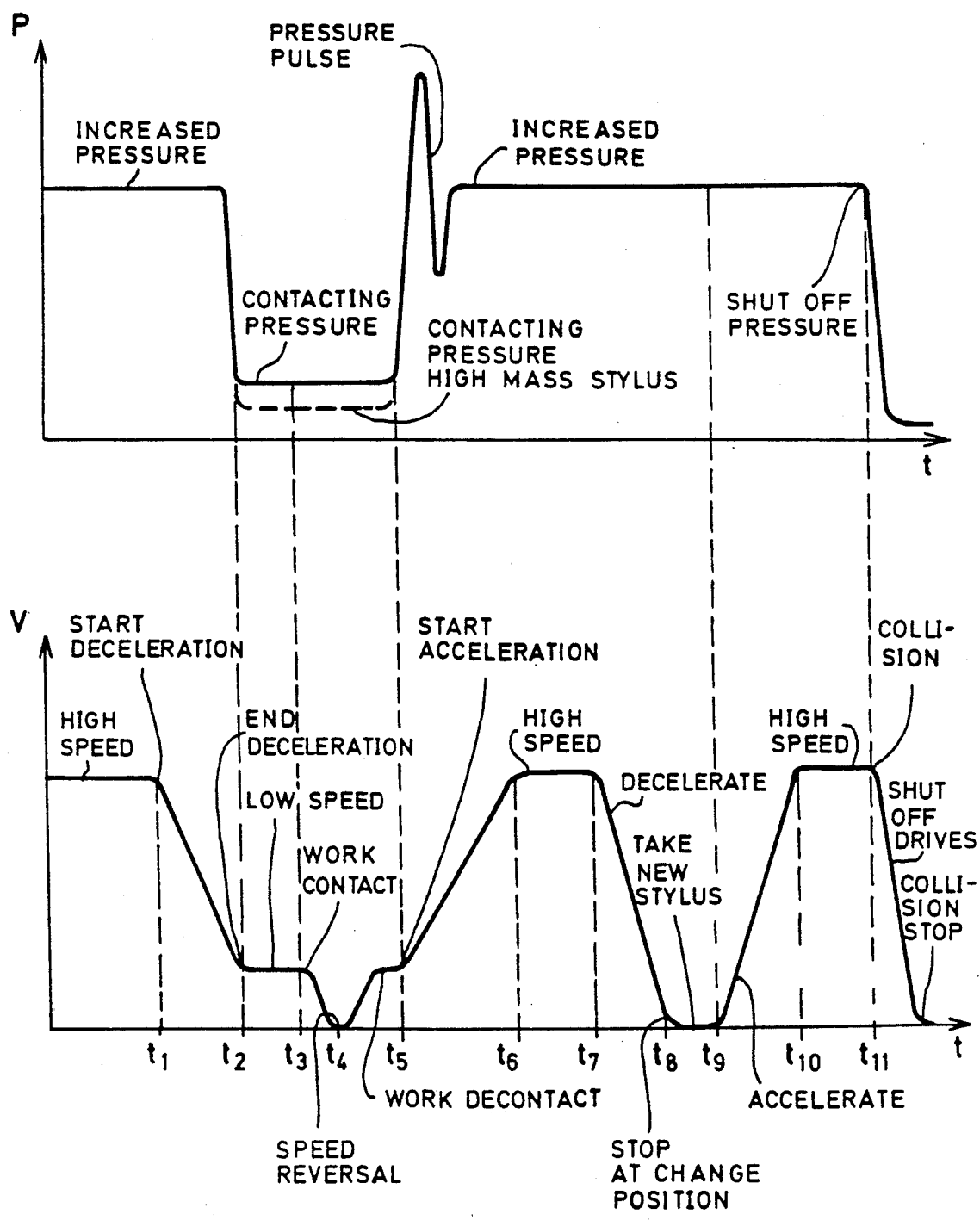

PROBE HEAD OF THE SWITCHING TYPE

BACKGROUND OF THE INVENTION

Mechanical probe heads in use to date on coordinate-measuring instruments can, in principle, be classified into two categories, namely probe heads of the so-called measuring type and probe heads of the so-called switching type. Probe heads of the measuring type supply an analog signal which is proportional to probe-pin deflection. Probe heads of the switching type provide a precision seat or bearing which determines the at-rest or null position of a deflectable probe pin when out of workpiece contact, and they supply a pulse-like electrical signal only at the moment of workpiece contact, namely, when the probe pin lifts off its seat, in the course of a workpiece-contacting procedure. Such probe heads are illustratively described in U.S. Pat. No. 4,153,998.

The probe pin is mounted to a movable part of the probe head, and a compression spring is conventionally used to preload the movable part into the seated at-rest or null position in the bearing. More refined probe heads furthermore have a so-called taring device by which the force of the compression spring can be adjusted, in compensation for gravitational effects. In this way, the contacting force which the probe pin exerts on the workpiece to be measured can be preselected, and the contact force can be maintained constant even if probe pins of different weight are substituted in the probe head.

However, there are disadvantages in using a compression spring in the pre-loading of a probe pin. On the one hand, during the lifting movement and in the course of the contacting process, as well as in making the taring adjustment, the compression spring produces torsional forces which can so twist the probe pin that it may not return to its seated at-rest position in the bearing. To prevent such an event, additional structural measures are necessary. Still further, deflection force increases during the deflection procedure, as a function of stiffness of the compression spring, and this circumstance presents the danger of breaking a relatively thin probe pin of hard metal or ceramic material.

Finally, long compression springs, as are required for large deflection paths, tend to kink, and resulting transverse forces impair the precision of reproducing the null position of the probe pin, upon return to its seated position in the bearing.

Federal Republic of Germany OS 3,420,139 discloses a sWitching-type probe head having a housing within which compressed air is operative. In this probe head, air pressure contributes to loading the probe pin, which is carried by a normally seated valve member; however, the actual pre-loading member in the known probe head is still a spring. The pressure within the probe head is not adjustable and is used solely to recognize the moment of workpiece contact during a contacting procedure.

Federal Republic of Germany OS 2,535,249 describes a probe head of the measuring type, having a probe pin which is displaceable linearly in all three directions in space, along three orthogonal guide systems. Plural pressure-fluid cylinders are contained in this probe head; they are arranged in each case parallel to the guide systems and are provided to assure workpiece contact by the probe pin, with constant contacting force. Aside from the fact that this is a probe pin of a different type, the pressure in the pressure-fluid cylinders cannot be changed, so that it is not possible to establish different contacting forces or to tare the probe head as a function of the weight of a given probe pin.

In the art of coordinate measurement, the trend is now toward making instruments which are faster and more variable, in order to be able to carry out a large number of different measuring tasks with a single instrument. As far as the probe head is concerned, this means that the contacting force which the probe pin exerts on the workpiece is to be changeable as rapidly as possible during a measuring procedure. Furthermore, when a given measurement program calls for use of many different probe pins at different times in the course of the program, the taring to effect gravitational compensation for each newly mounted probe pin must be performed as rapidly as possible, so that no measurement time is lost. This cannot be achieved with the necessary speed when a spring is the pre-loading means, even if its spring force were to be automatically adjustable, as by means of a setting motor.

BRIEF STATEMENT OF THE INVENTION

The object of the present invention is to provide a probe head which substantially avoids the above-indicated disadvantages.

The invention achieves this object by providing a piston under pneumatic pressure as the pre-loading means, and by providing adjustable regulating-valve means for varying the pneumatic pressure (P) acting on the piston.

The invention makes it possible to adjust the holding force of the pre-loading means very rapidly to different values so that, without loss of measurement time, different contacting forces can be established for the probe pin, and so that probe-pin combinations and sequences of different weight can be quickly tared. Moreover, the use of a pneumatic pre-loading member in a switching-type probe head also affords other advantages. Thus, the pre-loading force can remain constant, even while the probe pin is moving under deflection; as a result, the danger of probe-pin breakage is avoided. Furthermore, the range of selectable pre-loading force is far greater, for a given structural size of the probe, than is the case for a compression spring. Still further, pneumatic adjustment of the pre-loading force gives rise to no heat to be dissipated; this is in contrast to the heat-generation which must be taken into account in the case of motor-driven or electromagnetically controlled taring devices. Locally generated heat is particularly important in the coordinate measurement art, since all released heat results in expansion of materials, with consequent degrading of the calibrated null position of the probe pin.

The regulating valve for control of pressure acting on the pneumatic piston is advisedly connected to the control means of the coordinate-measuring system, and this valve is mounted to the measuring arm which also mounts the probe head. This affords the advantage that the control means can determine a large number of additional probe-head functions, for improving precision of measurement and/or functional reliability of the probe head. Thus, for example, upon a response of collision-protection circuitry within the system-control means, a rapid reduction in pressure at the pre-loading means can be effected at the probe head, so that the movable part of the probe head can yield with ease, in the event of a collision. Furthermore, the control means of the system can, after each cycle of workpiece contact, produce a pressure pulse or a pressure oscillation via the control valve in the pressure cylinder. In this way, the probe pin or its carrier is placed in vibration, as a result of which bearing-seat friction is overcome, and the probe pin can return to its null position, with greater precision.

It is also advantageous for the pressure piston to be developed as a ball. The spherical shape of a ball piston enables the piston to easily follow lateral movements of the probe-pin carrier in the course of any workpiece-contacting program. The ball diameter is preferably with clearance to the pneumatic cylinder bore within which the piston is movable, so that there can be a continuous bleeding flow of air between the spherical piston and the bore of the pneumatic cylinder, thus further assuring against friction between the piston and its cylinder.

Finally, it is advisable for the movable probe-pin-mounting probe head to be suspended by tension springs which compensate for the weight of the movable part itself. In this situation, and in sole reliance on the pneumatic means, the contact force which the probe pin exerts on the workpiece can be freely adjusted within wide limits, between a value of zero and the value which results from the maximum operating pressure.

DETAILED DESCRIPTION

Figure 1:
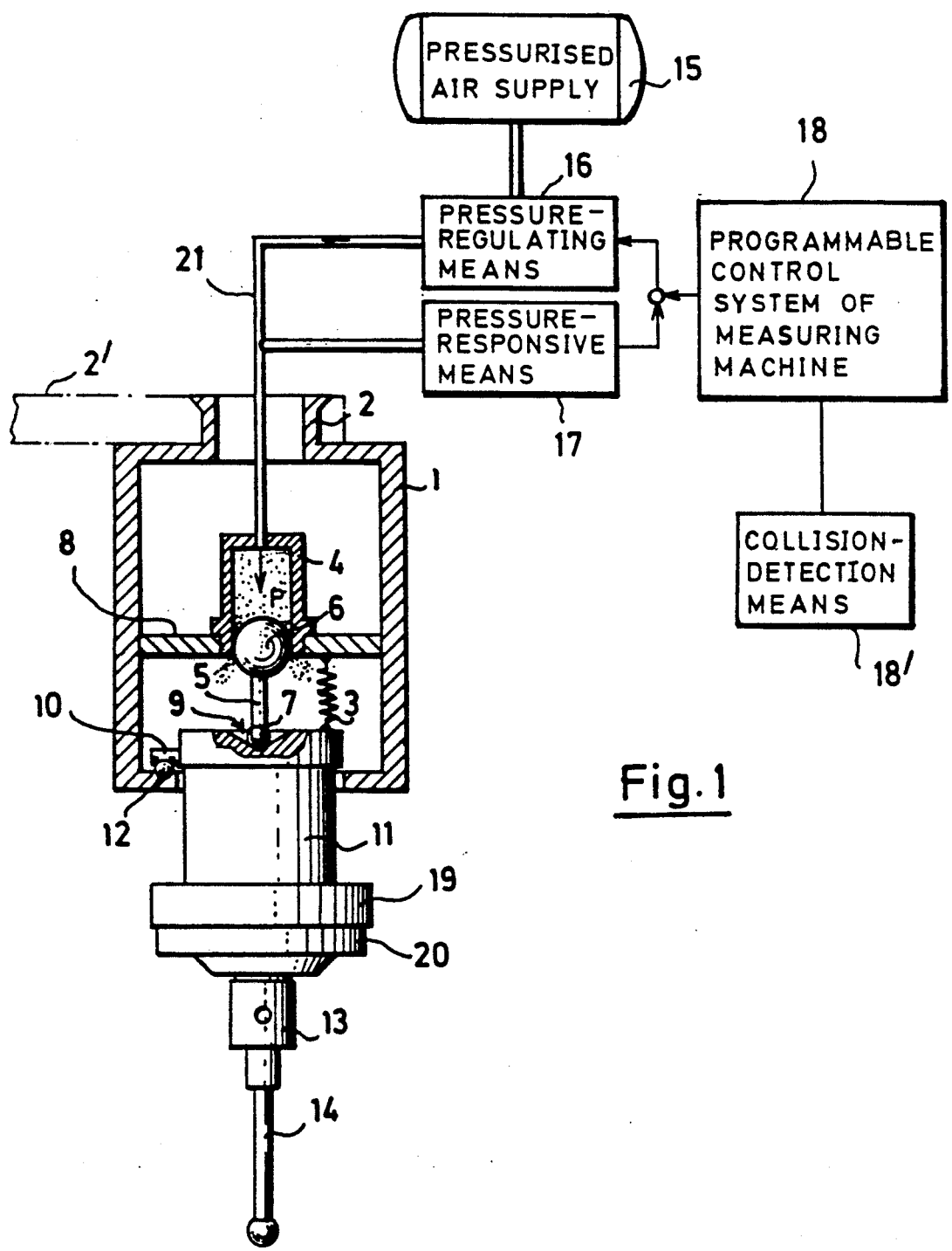

Further advantages of the invention will be evident from the following detailed description, in conjunction with the accompanying drawings, in which:

FIG. 1 is a diagram schematically showing the invention in application to a probe head of the switching type; and FIG. 2 comprises two curves respectively depicting pressure (P) and probe-head feed velocity (V) as functions of the same time scale.

The probe head of FIG. 1 has a cylindrical housing 1 which is configurated at its upper end, with a formation 2 by which the probe head can be secured to the measurement arm 2' of a coordinate-measurement machine. At its opposite end, the housing 1 has a radially inward flange which, within the housing, fixedly mounts three angularly spaced pairs of balls which provide the bearing or seat for determining the self-centering null or at-rest position of the movable part 11 of the probe head. In the position shown, only one ball 12 of one of the three pairs of balls of the bearing can be seen. Each pair of balls 12 establishes a notch, and the three notches formed by the pairs of balls are arranged 120° apart with respect to the longitudinal axis of the probe head; in the null position, three angularly spaced cylindrical bodies 10, which are radial projections of the movable part 11, locate in the notches between the paired seat balls 12. This arrangement of pairs of balls and cylindrical bodies is known per se; it reproduces with high precision the null position of a probe pin 14 mounted to the movable part 11 of the probe head.

The probe pin 14 is mounted via an adapter 13 to the lower end of the movable probe-pin carrier, and the separable parts 19, 20 of a chucking system are shown between adapter 13 and the probe-pin carrier 11. The chucking system may be and preferably is of the variety disclosed in U.S. Pat. No. 4,637,119, to which reference is made for detail. It suffices to state that this chucking system enables probe pin 14 to be automatically exchanged for a pre-determined other probe pin, available from an inventory of one or more other probe pins, or for complete probe-pin combinations consisting of a plurality of probe pins, and that the releasable chucking connection between two plates, designated 19 and 20, includes another three-point bearing which accurately reproduces the position of the probe pin at completion of a probe-pin changing procedure.

Within the housing 1, a shelf or bracket part 8 of the housing establishes a fixed reference from which three tension springs suspend the movable probe-carrier 11. Only one of three angularly spaced springs, namely, the spring 3, is shown in the drawing.

The force of these springs is such that, when the base plate 20 of the probe-pin combination having the greatest permissible weight is substituted by chucked engagement to the change plate 19, the weight of the entire movable system (11, 19, 20, 13, 14) is somewhat less than the spring force, and the null-locating bearing system (10, 12) is just relieved of load.

The shelf or bracket 8 has a central opening which is fitted with an upstanding pneumatic cylinder 4 which is open downward, in the direction toward the probe pin.

Within this pressure cylinder 4, a spherical pressure piston 6, with an attached piston arm 5, engages and applies downward force to the top center of the movable probe-pin carrier, via the lower spherical head 7 of rod 5 in engagement with a prismatic notch in the top of member 11. The articulated connection of the movable probe-pin carrier 11 to the pre-loading means 4, 6, and the spherical development of the piston and the piston-rod head 7, will be seen to permit universal action in the piston connection to member 11, so that upon displacement of member 11 out of its seated position in the course of a work-contacting program of the probe head, piston-developed loading force will be continuously and uniformly applied to the movable probe-pin carrier, regardless of any turning, tilting or twisting of the connecting rod 5.

The interior volume of cylinder 4 is provided with compressed air from a supply unit 15 via a line 21 which includes a regulator valve 16. The flow of air continuously bleeds via the clearance of piston 6 in the bore of cylinder 4, with venting to ambient air via the much larger clearance between movable member 11 and the lower flange of housing 1. In this way, piston 6 is air-mounted and thus guided without friction, and pressure of air delivered by line 21 (i.e. pressure in excess of the pressure drop attributable to bleeding to ambient air) is actively loaded on piston 6.

The pressure-regulating valve 16 is connected to pressure-responsive means 17 in a pressure-control circuit, wherein the set point program for pressure regulation is governed by the computer program of the control means 18 of the coordinate-measuring machine to which the probe head is mounted. In this way, pressure within cylinder 4 can be so adjusted, continuously or in several steps, to different values, so that the preloading of seating action at 10, 12 (and thus the contact force of the probe pin 14) can be varied between zero and a pre-determined maximum value.

Furthermore, after each change from one to another of probe pin (14), the control means 18 will be understood to perform a taring procedure, whereby weight changes between different successively chucked probe pins are automatically compensated, by a corresponding increase or reduction in the pressure of air to cylinder 4, and in such manner that the movable part 11 of the probe head seats with consistently the same force in its bearing 10, 12, regardless of weight differences between successively chucked probe pins.

With the probe head of the invention, it will be seen to be possible to make rapid coordinate measurements, even if probe pins of relatively high mass are involved. Prior to this invention, measurements using high-mass probe pins was problematical, since inertia of the probe pin could, in accelerating and decelerating phases of the measuring instrument, give rise to a lifting of the probe pin out of its null-defining seat in the probe head, and thus simulate a contacting procedure. In the probe head of the invention, on the other hand, the pressure for seating engagement of member 11 to the bearing 12 can be adjusted by the control means 18 of the coordinate-measuring machine, not only during acceleration and deceleration phases of a given program but also during operations between different positions within the measurement range; and such adjustment can be to a sufficiently high value which assures that the probe pin will remain in its bearing. Only when the probe head is to be moved with its customarily lower speed of contact with the workpiece is the pressure adjusted to the lower value which determines the measurement force, namely, the measurement force which is the same regardless of mass differences between successively chucked probe pins.

The pressure (P) and velocity (V) curves of FIG. 2 will aid in describing some of the various coordinated operations achievable with the apparatus of FIG. 1, under suitably programmed control by the computer-operated means 18 of the coordinate-measuring machine. In FIG. 2, the pressure P is that which exists within cylinder 4, pursuant to computer-controlled setting of regulating means 16, and the velocity V is that of the probe head, in the course of different computer-controlled cycles of feeding advance into and retraction from workpiece contact. The instant of workpiece contact is preferably sensed by a piezoelectric element (not shown) forming part of the probe pin 14; this piezoelectric element provides an electric-pulse signal output that is indicative of workpiece contact.

Let it be assumed that the coordinate-measuring machine is in a workpiece-contacting cycle wherein the probe head 1 is being moved at high speed, advancing its probe pin 14 towards the workpiece, until a time $t_1$ which is predetermined to be prior to a time $t_2$ when the probe is close to its expected region of workpiece contact, i.e. when slow speed characterizes the advancing feed of the probe head. Throughout the high-speed interval to time $t_1$, and continuing through the deceleration interval to time $t_2$, the loading pressure P is held (by computer control of regulating means 16) to a relatively high level, thus assuring against inertial dislocation of the null position of the probe pin. As soon as low speed is achieved, at $t_2$, the pressure in cylinder 4 is reduced to a "contacting pressure" value, which will be understood to have been predetermined, based on known mass of the involved probe pin (stylus) 14. Workpiece contact is made at $t_3$, under conditions of slow speed and "contacting pressure" in cylinder 4. Having detected contact with the workpiece, the advancing feed of the probe head is reduced to zero ($t_4$) and is reversed, with loss of workpiece contact at $t_5$.

In the interval $t_5$ to $t_6$, the probe head is subjected to acceleration in the reverse direction, withdrawing the probe pin 14 from the region of workpiece contact, and during this interval, high-pressure loading of the ball piston 6 is re-established, commencing with a transient pulse to even greater pressure, whereby to impart a mechanical shock to the movable part 11 of the probe head, thus affording enhanced assurance of null-position seating in the three-point bearing (10/12).

In the illustrative example of FIG. 2, the acceleration phase ($t_5$ to $t_6$) of probe-head withdrawal is utilized in preparation for the next workpiece contact to be made. This may involve reorientation of the workpiece via measuring-machine instrumentalities (not shown), or reorientation of the probe head 1, or the automated exchange of probe pin 14 for another probe pin that is better suited for making the next cycle of workpiece contact. Thus, at $t_6$, the machine will be understood to have achieved high speed for one or more of these changes, and the probe head can be hurrying to a probe-pin magazine (not shown) for its programmed probe-pin (stylus) exchange. Shortly before reaching the magazine, i.e. at $t_7$, the machine begins to decelerate and comes to rest at $t_8$ in the exchange position. In the thus-arrested interval to $t_9$, the used probe pin 14 is returned to the magazine and another is automatically chucked to the movable part 11 of the probe head. Once the probe head is assembled to the substituted probe pin, acceleration resumes, reaching high speed at $t_{10}$.

The newly substituted probe pin will be assumed to be of greater mass than the probe pin 14 used for the first described workpiece-contact cycle. This being the case, the newly substituted probe pin will necessarily apply an increased gravitational force in the direction of null-position seating in the three-point bearing (10/12). As a result, lesser pressure is needed to achieve the same contacting force, as compared with the described first cycle of workpiece contact, it being desired that contacting force be constant, for a range of different probe-pin weights. The pressure curve of FIG. 2 illustrates the taring function responsible for this lesser-pressure situation, by dashed outline and accompanying legend, for contacting pressure involving a high-mass stylus.

But let it be assumed that, on its way back to the intended location for the next cycle of workpiece contact and measurement, a collision occurs at $t_{11}$ between the probe pin and the workpiece. The piezoelectric component of the probe pin will of course produce an electric signal pulse in that event, and because this pulse is occurring at an unanticipated time in the programmed cycle, this circumstance may be the basis for the machine computer, through circuit means 18' to recognize the event as a collision, with immediate control of all drives to shut-down and with pressure P reduction to zero or near zero, thus minimizing destructive force action on the probe.

It is of course to be understood that, once a sequence of workpiece contacting has been correctly programmed into the measuring machine, a collision event is unlikely. Therefore, the described single workpiece-contact cycle will be understood to be but one of a larger plurality, in the course of a given automated measurement program on a particular workpiece.

What is claimed is:

1. In a coordinate-measuring machine having a movable measurement arm and a probe head mounted to said arm and programmable control means for moving said arm and its probe head in an automated program of probe-pin contact with and removal from a workpiece to be measured, said probe head comprising a probe-head housing and a movable member for deflectably mounting a probe pin with respect to the housing, wherein loading means normally and yieldably retains the movable member in precisely seated relation to the housing and in readiness to generate an electric signal upon probe-pin contact with a workpiece, the improvement wherein said loading means comprises a cylinder, a pneumatically operated piston in said cylinder, and wherein pneumatic-supply means for operating said piston includes and adjustably resettable regulating valve with means for varying the pressure operating on the piston, and means connecting said programmable control means to said regulating valve for automatically varying the setting of the regulating valve in the course of a given program of workpiece-contacting measurements.

2. The coordinate-measuring machine of claim 1, in which said movable member includes means for removable mounting of a selected one of a plurality of probe pins of different weight, and in which said control means is programmed for a taring reset of regulated pressure upon each change from one to a different probe pin and in accordance with the weight of the newly inserted probe pin.

3. The improvement of claim 1, in which said pneumatically operated piston is a ball having radial clearance with said cylinder.

4. The improvement of claim 1, in which said movable member has a central axis of seating symmetry, and said piston has a direct-arm loading connection to said movable member and along said central axis when said member is in its seated position.

5. The improvement of claim 1, in which said pneumatically operated piston is pivotally connected to said movable member.

6. The improvement of claim 1, in which said movable member is suspended on springs which substantially compensate for the weight of said movable member, whereby the pressure acting on said piston applies substantially only preloading force to said movable member.

7. In a coordinate-measuring machine having a movable measurement arm and a probe head mounted to said arm and programmable control means for moving said arm and its probe head in an automated program of probe-pin contact with and removal from a workpiece to be measured, said probe head comprising a probe-head housing and a movable member for deflectably mounting a probe pin with respect to the housing, wherein loading means normally and yieldably retains the movable member in precisely seated relation to the housing and in readiness to generate an electric signal upon probe-pin contact with a workpiece, the improvement wherein:
said loading means is pneumatically operated,
pneumatic-supply means for operating said loading means includes adjustable resettable regulating means for varying the pressure operating on said loading means,
said programmable control means is connected to said regulating means for adjustably varying the setting of said regulating means in the course of a given program of workpiece-contacting measurements, and
said control means includes an anti-collision circuit with collision-detection means, said control means being operative, in the event of a collision, to reset said regulating means for rapidly reduced pressure operating on said loading means.

8. In a coordinate-measuring machine having a movable measurement arm and a probe head mounted to said arm and programmable control means for moving said arm and its probe head in an automated program of probe-pin contact with and removal from a workpiece to be measured, said probe head comprising a probe-head housing and a movable member for deflectably mounting a probe pin with respect to the housing, wherein loading means normally and yieldably retains the movable member in precisely seated relation to the housing and in readiness to generate an electric signal upon probe-pin contact with a workpiece, the improvement wherein:
said loading means is pneumatically operated,
pneumatic-supply means for operating said loading means includes adjustable resettable regulating means for varying the pressure operating on said loading means, and means connecting said programmable control means to said regulating means for adjustably varying the setting of said regulating means in the course of a given program of workpiece-contacting measurements;
said automated program includes successive cycles of acceleration and deceleration of the probe head in connection with each point of workpiece-contact to be measured; and
during the acceleration and deceleration phases of each cycle of probe-head movement in a work-contact program, said control means is programmed to set said regulating means to a relatively high value of regulated pressure for acceleration and then to a relatively low value during a period of probe-head movement with relatively slow contacting speed into workpiece contact.

9. In a coordinate-measuring machine having a movable measurement arm and a probe head mounted to said arm and programmable control means for moving said arm and its probe head in an automated program of probe-pin contact with and removal from a workpiece to be measured, said probe head comprising a probe-head housing and a movable member for deflectably mounting a probe pin with respect to the housing, wherein loading means normally and yieldably retains the movable member in precisely seated relation to the housing and in readiness to generate an electrical signal upon probe-pin contact with a workpiece, the improvement wherein:
said loading means is pneumatically operated,
pneumatic-supply means for operating said loading means includes adjustable resettable regulating means for varying the pressure operating on said loading means,
said programmable control means is connected to said regulating means for adjustably varying the setting of said regulating means in the course of a given program of workpiece-contacting measurements, and
after each contact and removal of probe-pin engagement with a workpiece, said control means is operative upon said regulating means to develop a transient high-pressure pulse or a pressure oscillation in said loading means, whereby to impart a mechanical shock to the movable member of the probe head, thus affording enhanced assurance of null-position seating of the movable member in relation to said housing.

* * * * *